United States Patent
Kawakami et al.

(10) Patent No.: US 7,943,707 B2
(45) Date of Patent: May 17, 2011

(54) VINYLIDENE FLUORIDE POLYMER AND PROCESS FOR PRODUCING THE SAME

(75) Inventors: Tomoaki Kawakami, Chiba-Ken (JP); Takumi Katsurao, Tokyo (JP)

(73) Assignee: Kureha Corporation, Tokyo (JP)

( * ) Notice: Subject to any disclaimer, the term of this patent is extended or adjusted under 35 U.S.C. 154(b) by 753 days.

(21) Appl. No.: 11/791,324

(22) PCT Filed: Nov. 21, 2005

(86) PCT No.: PCT/JP2005/021358
§ 371 (c)(1),
(2), (4) Date: May 23, 2007

(87) PCT Pub. No.: WO2006/061988
PCT Pub. Date: Jun. 15, 2006

(65) Prior Publication Data
US 2008/0071045 A1 Mar. 20, 2008

(30) Foreign Application Priority Data

Dec. 8, 2004 (JP) .................................. 2004-355938

(51) Int. Cl.
*C08F 2/00* (2006.01)
*C08F 14/18* (2006.01)
(52) U.S. Cl. ........................................ 526/73; 526/255
(58) Field of Classification Search .................... 526/73, 526/255
See application file for complete search history.

(56) References Cited

U.S. PATENT DOCUMENTS

| 3,624,064 A | * | 11/1971 | Toyoda et al. .................. 526/73 |
| 3,780,007 A | | 12/1973 | Stallings et al. |
| 2002/0143103 A1 | | 10/2002 | Katsurao et al. |

FOREIGN PATENT DOCUMENTS

| EP | 0 417 585 | 3/1991 |
| EP | 1 227 109 | 7/2002 |
| EP | 1 454 920 | 9/2004 |
| JP | 46-3588 | 1/1971 |
| JP | 46-14465 | 4/1971 |
| JP | 47-44032 | 11/1972 |
| JP | 62-104815 | 5/1987 |
| JP | 2002-220403 | 8/2002 |

OTHER PUBLICATIONS

Supplementary European Search Report issued May 11, 2009 in corresponding European Application No. 05 80 9462.

* cited by examiner

*Primary Examiner* — William K Cheung
(74) *Attorney, Agent, or Firm* — Wenderoth Lind & Ponack, L.L.P.

(57) ABSTRACT

A monomer comprising vinylidene fluoride as a principal component is suspension-polymerized by supplying the monomer in division to a polymerization system containing a polymerization initiator at a pressure below a critical pressure Pcr (=4.38 MPa) of vinylidene fluoride and at a pressure above Pcr. As a result, a vinylidene fluoride polymer having excellent high-temperature coloring resistance and with remarkably less elution of organic matter and ionic components is produced, without using a specific halogenated hydrocarbon and without incurring troublesome labor and cost for recovery thereof.

8 Claims, No Drawings

VINYLIDENE FLUORIDE POLYMER AND PROCESS FOR PRODUCING THE SAME

TECHNICAL FIELD

The present invention relates to a vinylidene fluoride polymer (i.e., a homopolymer or a copolymer of vinylidene fluoride) having excellent thermal stability and a high purity, and a process for production thereof. More specifically, the present invention relates to a vinylidene fluoride polymer having excellent high-temperature coloring or discoloration resistance, and remarkably less liable to result in elution of organic matter or ionic components compared with a conventional vinylidene fluoride polymer obtained through suspension polymerization, and a process for production thereof.

BACKGROUND ART

A vinylidene fluoride polymer is a crystalline polymer and is used for providing various shaped products as a polymer having good mechanical strength. In this instance, for the purpose of providing such a shaped product with a good size stability suitable for the intended use, it has been generally practiced to subject the shaped product before the use thereof to a sufficient heat treatment (hereinafter sometimes called "aging") so as to remove a strain during the shaping and cause additional crystallization. After the aging, however, the shaped product is liable to color into yellow or brown sometimes, thus lowering the commercial value thereof. Accordingly, a hardly colorable vinylidene fluoride polymer resin has been desired, and some commercial products of improved colorability have been put on the market, but further improvements have been desired.

As processes for producing vinylidene fluoride polymers, there have been known solution polymerization, emulsion polymerization and suspension polymerization. Solution polymerization is generally performed at a polymerization temperature of 20-80° C. and at a relatively low pressure of, e.g., at most 1.5 MPa, for providing a polymer used for paint having a relatively low molecular weight of, e.g., a number-average molecular weight of at most $10^5$ corresponding to at most ca. 0.5 dl/g in terms of an inherent viscosity described hereinafter, and other polymerization processes are used for producing vinylidene fluoride polymers of higher molecular weights used for shaped products, etc. Further, because of a strong hydrogen-abstracting power of growing vinylidene fluoride radicals, the solvents usable therefor are restricted, and ketone solvents or acetate ester solvents (Patent document 1 listed below), chlorofluoroethane solvents (Patent document 2 below), etc., have been used.

In emulsion polymerization, a chemically stable fluorine-containing emulsifier or buffer agent is used for the polymerization to obtain a polymerizate comprising a latex having small particle sizes of 0.2-0.5 μm, which is then treated with a flocculant, etc., for precipitation and particle formation to obtain polymer particles. Emulsion polymerization has an advantage of a rapid polymerization speed, but is accompanied with difficulties in convenience and production cost due to the use of an expensive emulsifier, and also difficulties, such as powder recovery through agglomeration and precipitation, and removal of ionic impurities originated from the flocculant.

Suspension polymerization is a process which has been practiced since development of initiators exhibiting polymerization initiation ability at low temperatures so as to make possible polymerization at a temperature below 30.1° C. (i.e., critical temperature of vinylidene fluoride monomer). Vinylidene fluoride monomer alone or together with a copolymerizable monomer is dispersed within water, and the resultant monomer droplets are subjected to polymerization in the presence of a polymerization initiator. It is also possible to start the suspension polymerization at a temperature below 30.1° C. and then continue the polymerization by raising the temperature after formation of the particles. The suspension polymerization allows easy post-processing of the resultant polymer and is most suited for providing a vinylidene fluoride polymer excellent in processability, mechanical properties and thermal stability.

It is well known that the selection and used amount of a suspension agent, a chain transfer agent and a polymerization initiator have influences on the coloring characteristic of a vinylidene fluoride polymer obtained in the polymerization and a shaped product thereof. For example, a suspension polymerization process for a vinylidene fluoride polymer less liable to be colored by using a specific chain transfer agent (chain-adjusting agent), such as bis(ethyl) carbonate, has been proposed (Patent document 3 below). However, even in, the case of using such a chain transfer agent, the resultant vinylidene fluoride polymer has left a room for improvement regarding the durability, and also difficulties, such as the necessity of a high polymerization pressure and scaling on the gaseous phase wall in the polymerization vessel due to gaseous-phase polymerization.

Further, it has been also proposed to produce a vinylidene fluoride polymer improved in high-temperature coloring resistance and low elutability by using a special halide solvent which shows good dissolving power to both vinylidene fluoride monomer and polymerization initiator and also shows a low chain transfer effect, to reduce the used amount of the polymerization initiator (Patent document 4 below). The process surely provides a vinylidene fluoride polymer improved in high-temperature coloring resistance and low elutability, but is accompanied with a problem requiring troublesome labor and cost for recovering a relatively expensive solvent. Also, a further overall improvement in high-temperature resistance and low elutability is desired.

Patent document 1: JP-A 59-135257,
Patent document 2: JP-A 6-322028,
Patent document 3: JP-B 3-48924,
Patent document 4: JP-A 2002-220403.

DISCLOSURE OF INVENTION

In view of the above-mentioned problems of the prior art, a principal object of the present invention is to provide a vinylidene fluoride polymer having a high-temperature coloring resistance which has been further improved than ever, and also a commercially feasible process for producing such a vinylidene fluoride polymer.

As a result of the present inventors' study with the above-mentioned object, it has been found desirable, for achieving the object, to use up a relatively small amount of polymerization initiator, and for the realization thereof, it has been found very effective to initially cause a polymerization initiator and only a part of vinylidene fluoride monomer to be co-present in the suspension polymerization system, then raise the temperature to a polymerization temperature T while allowing the polymerization system pressure to exceed a critical pressure Pcr of vinylidene fluoride monomer, and feed an additional amount of vinylidene fluoride so as to retain the system pressure which tends to lower with the continuation of the polymerization, thereby providing a period of retaining the system pressure of at least Pcr to form a suspension polymerization system wherein abundant vinylidene fluoride is always present in the vicinity of radicals generated from the polymerization initiator to allow the effective utilization of the polymerization initiator.

Based on finding as described above, the process for producing a vinylidene fluoride polymer of the present invention comprises: effecting suspension polymerization of a monomer principally comprising vinylidene fluoride by feeding the monomer in division at a pressure below the critical pressure Pcr thereof and at a pressure of at least Pcr to a polymerization system containing a polymerization initiator. By such divisional feed of vinylidene fluoride, it is also possible to increase the volumetric efficiency of the polymerization system while preventing the excessive pressure increase in the polymerization system.

In the process of the present invention, it is important to add a polymerization initiator to the polymerization system from the beginning and allow the polymerization to start before reaching a supercritical state. This is effective for achieving the object of the present invention, i.e., to obtain a vinylidene fluoride polymer having an excellent high-temperature coloring resistance and containing little elutable components, through reduction due to effective utilization of a polymerization initiator and polymerization aids such as a suspension agent, in addition to a consideration from the safety aspect of obviating an increased risk at the occurrence of trouble caused by addition of a polymerization initiator at a high temperature and a high pressure. More specifically, in the case of adding a polymerization initiator together with a monomer or another solvent to the polymerization system after reaching a supercritical state, because of an enhanced mobility of the system, it becomes difficult to achieve uniform dispersion of the added polymerization initiator, etc., so that an increased amount of polymerization initiator is required in order to obtain a stable dispersed state of monomer droplets containing the polymerization initiator dispersed therein. This is not desirable for achieving the object of the present invention of obtaining a vinylidene fluoride polymer excellent in high-temperature coloring resistance and with little elutable components. Further, the addition of a polymerization initiator after reaching a supercritical state is disadvantageous for performing uniform polymerization and is liable to increase side reactions, such as hydrogen abstraction and disproportionation due to abrupt radical generation at sites of localized polymerization initiator. Thus, it is very important to form a state of monomer droplets to which a relatively small amount of polymerization initiator is stably distributed by using a relatively small amount of suspension agent and initiate the polymerization at a low temperature to form stable particles of polymer nuclei or shell in an early stage, in preparation for additional supply of vinylidene fluoride to the polymerization system above the critical pressure.

Further, the vinylidene fluoride polymer of the present invention is produced in the above-described manner and is characterized by heat-stability and high purity represented by an eluted total organic carbon of at most 1500 ppb and an ionic conductivity of at most 10 μs/cm after immersion in pure water at 85° C. for 1000 hrs, and also a yellowness index YI of at most 0 after holding at 260° C. for 3 hours.

BEST MODE FOR PRACTICING THE INVENTION

Hereinbelow, some preferred embodiments of the present invention will be described successively.

The vinylidene fluoride polymer as a principal product of the present invention includes homopolymer of vinylidene fluoride (critical temperature Tc=30.1° C., critical pressure Pcr=4.38 MPa) and also a copolymer of vinylidene fluoride as a principal component, preferably in at least 50 wt. %, more preferably 65 wt. % or more, with a monomer copolymerizable with vinylidene fluoride. Examples of the monomer copolymerizable with vinylidene fluoride may include: vinyl fluoride, trifluoroethylene, tetrafluoroethylene, chlorotrifluoroethylene, hexafluoropropylene, and perfluoroalkyl vinyl ether, but these are not exhaustive. It is also possible to use a non-fluorine-containing monomer, such as ethylene, monomethyl maleate or alkyl glycidyl ether, but these are not exhaustive.

In the process of the present invention, vinylidene fluoride alone or a mixture thereof with a monomer copolymerizable therewith (hereinafter these are inclusively referred to as a "vinylidene fluoride monomer") in an initially charged amount of 100 wt. parts and a relatively small amount of polymerization initiator are dispersed for suspension polymerization in an aqueous medium in an amount of 200-500 wt. parts, preferably 250-350 wt. parts (which can be regarded as the amount of water alone while the aqueous medium can further include various additives such as a dispersion stabilizer) to start the suspension polymerization while raising the temperature up to a polymerization temperature T.

A polymerization initiator having a 10 hour-half-life temperature $T_{10}$ of from 30° C. (nearly the critical temperature of vinylidene fluoride) to 90° C. is preferred. Preferred examples thereof may include: diisopropyl peroxydicarbonate ($T_{10}$=40.5° C.), dinormalpropyl peroxydicarbonate ($T_{10}$=40.3° C.) and perbutyl peroxypivalate ($T_{10}$=54.6° C.), and diisopropyl peroxydicarbonate is most preferred.

The use of as small an amount as possible of polymerization initiator is suited for the object of the present invention of providing a vinylidene fluoride polymer of good heat-stability, but too small amount results in an extremely long polymerization period. Accordingly, it is preferred to use an amount in a range of 0.001-0.12 wt. %, more preferably 0.001-0.09 wt. %, further preferably 0.001-0.06 wt. %, with respect to a total amount of vinylidene fluoride monomer (a total of the above-mentioned initially charged amount and an additional amount added in the course of polymerization). An amount in excess of 0.12 wt. % is difficult to effectively use it up in the polymerization, thus being liable to result in inferior high-temperature coloring resistance and elutability of the resultant polymer.

In the present invention, it is also preferred to use a relatively small amount of suspension agent to form a dispersion system, and a suspension agent, such as methyl cellulose, hydroxyethyl cellulose, hydroxypropyl cellulose, hydroxypropylmethyl cellulose, partially saponified polyvinyl acetate or an acrylic acid-type polymer, is preferably used in an amount of 0.01-0.1 wt. %, more preferably 0.01-0.07 wt. %, with respect to the initially charged vinylidene fluoride monomer.

In the polymerization process of the present invention, a known chain transfer agent can be used for adjusting the molecular weight of the resultant polymer. It is possible to use, e.g., ethyl acetate, propyl acetate, acetone or diethyl carbonate. The vinylidene fluoride polymer of the present invention may preferably have an inherent viscosity (a logarithmic viscosity at 30° C. of a solution of 4 g of a polymer in 1 liter of N,N-dimethylformamide) of at least 0.6 dl/g, particularly 0.8-1.5 dl/g, so as to provide a molecular weight suitable as a material for providing shaped product.

The polymerization temperature T (° C.) may preferably be set so as to satisfy a condition of $T_{10} \leq T \leq T_{10}+25$ with respect to the 10 hour-half-life temperature $T_{10}$ (° C.) of a polymerization initiator used.

In case where the polymerization temperature T is below $T_{10}$, it becomes necessary to increase the used amount of the polymerization initiator in order to ensure a feasible productivity of the polymer (e.g., a polymer yield of at least 80% within a polymerization period of 30 hours) since the speed of radical generation from the polymerization initiator is slow. As a result, the product vinylidene fluoride polymer is caused to have inferior coloring resistance and inferior elution characteristic. This is presumably because of too high a radical generation velocity which leads to increased side reactions, such as disproportionation between radicals and hydrogen abstraction in addition to contribution to the polymerization of vinylidene fluoride.

When the system is raised to a polymerization temperature T, the system pressure exceeds Pcr due to the initially charged vinylidene fluoride monomer, and then the system pressure tends to be lowered with the progress of the polymerization. Under the situation, an additional vinylidene fluoride monomer is successively supplied so as to keep the system pressure P substantially at constant, preferably before the system pressure (polymerization pressure) falls below Pcr. Incidentally, it is preferred to set the polymerization conversion of the initially charged monomer to below 20% at a time when the system pressure first reaches Pcr, i.e., to suppress the progress of polymerization at a pressure below Pcr, so as to increase the effect of high-pressure polymerization according to the process of the present invention.

The polymerization pressure P at the time of addition of vinylidene fluoride monomer in the course of polymerization should be not lower than the critical pressure (=4.38 MPa) of vinylidene fluoride. Thus, it is considered that the addition and polymerization of the monomer in a supercritical state promote the movement of the monomer to the reaction sites, thereby allowing effective polymerization with respect to radicals. In case where the polymerization pressure P exceeds the critical pressure of vinylidene fluoride+5 (MPa), a so-called excessively packed state is caused to not only affect the particle formation due to coalescence of polymer particles but also lead to a danger of high pressure. To change the polymerization pressure in this period only results in instability of the polymerization system and provides no advantage. Accordingly, it is preferred to keep a substantially constant polymerization pressure (within ±10%, more preferably with ±5%) in the range of from Pcr to Pcr+5 (Mpa) as described above during the period of supplying the additional monomer in the course of polymerization. It is preferred to effect the supply of additional monomer after the initially charged monomer is polymerized to some extent to form polymerization nuclei and stable particles. More specifically, it is preferred to start the supply of the additional monomer at a point of polymerization conversion of the initially charged monomer having reached 0.1-70%, more preferably 0.5-50%, further preferably 1-40%.

The amount of the additional vinylidene fluoride monomer supplied in the course of polymerization is preferably 20-200 wt. parts, more preferably 50-150 wt. parts, with respect to 100 wt. parts of the initially charged monomer. Below 20 wt. parts, the effect of divisional supply according to the present invention becomes scarce. In excess of 200 wt. parts, the polymerization velocity is liable to be remarkably lowered due to deactivation of the initially charged polymerization initiator.

The point of termination of the polymerization should be appropriately determined in view of a balance between the reduction of non-reacted monomer and the prolongation of the polymerization period. After the termination of the polymerization, the polymer slurry is de-watered, washed with water and dried to obtain polymer powder.

As described before, the vinylidene fluoride polymer of the present invention produced through the above-mentioned steps is characterized by heat-stability and high purity represented by an eluted total organic carbon of at most 1500 ppb and an ionic conductivity of at most 10 µS/cm after immersion in pure water at 85° C. for 1000 hrs, and also a yellowness index YI of at most 0 after holding at 260° C. for 3 hours. Herein, the above-mentioned properties are based on measured value according to the following elution test and colorability evaluation.

(Elution Test for Pressed Sheet)

Each powdery vinylidene fluoride polymer sample is pressed at 220° C. into a sheet, from which 18 cut samples (each having sizes of ca. 40 mm×10 mm×0.3 mm) are cut out and placed in a polypropylene-made container (inner volume: 100 ml, weight: ca. 18 g, trade name: "AIBOY", made by AS ONE CORPORATION) for rinsing in pure water, followed by immersion in pure water (having a resistivity of at least 1 MΩ) at 85° C. for 2 hours and placement in 100 ml of fresh pure water. Then, the samples are left standing at 85° C. for 1000 hours to measure an ionic conductivity of the water by an ionic conductivity meter (a conductivity meter "DS-51", made by Horiba Ltd.) and a TOC concentration of the water by a total organic carbon meter, respectively. With respect to the eluted amount, an amount of 1540 ppb measured with respect to 100 ml of pure water placed in a fresh polypropylene container and left standing at 85° C. for 1000 hours is subtracted from the above-measured value to determine an eluted amount from the sample vinylidene fluoride polymer.

(Colorability Evaluation)

Each powdery vinylidene fluoride polymer in an amount of 14 g is placed in Teflon (registered trade mark)-made crucible and left standing at 260° C. for 3 hours in a Geer-type oven to be melted. The crucible is cooled in air down to room temperature, and the resultant lump sample is taken out to be pressed at 220° C. into a sheet, of which the color tone is measured by a color difference meter ("ZE-2000", made by Nippon Denshoku K.K.) and evaluated in terms of a yellowness index YI. A smaller YI-value represents a less colorability.

The vinylidene fluoride polymer of the present invention thus formed can be preferably used as a material for various form products by taking advantage of its excellent anti-heat stability and low elution characteristic.

Hereinbelow, the present invention will be described more specifically based on Examples and Comparative Examples.

EXAMPLES

Example 1

Into an autoclave having an inner volume of 2 liter, 1,040 g of deionized water, 0.20 g of methyl cellulose, 12 g of ethyl acetate, 0.2 g of diisopropyl peroxydicarbonate and 400 g of vinylidene fluoride, were charged, and the system was raised in temperature up to 50° C. in 2 hours and held at 50° C. During this period, a maximum pressure of 6.3 MPa was reached at a point of polymerization conversion of ca. 5%. Further, from a point of time after 0.5 hour (as a period lapsed from the temperature raised to 50° C.) when the polymerization conversion of the initially charged monomer reached ca.

30% to reach a pressure of 6.0 MPa, 444 g of vinylidene fluoride was gradually added so as to keep a polymerization pressure of 5.99-6.01 MPa (>Pcr=4.38 MPa). Polymerization was continued for 4 hours at 50° C. after the addition to effect a totally 23.8 hours of suspension polymerization from the temperature raising until the pressure was lowered to 4.5 MPa. After the polymerization, the polymer slurry was dewatered, washed with water and dried at 80° C. for 20 hours to obtain Polymer powder A. The polymerization conversion was 86.5%, and Polymer A thus obtained exhibited an inherent viscosity of 1.15 dl/g.

Example 2

Into an autoclave having an inner volume of 2 liter, 1,040 g of deionized water, 0.20 g of methyl cellulose, 15.2 g of ethyl acetate, 0.2 g of diisopropyl peroxydicarbonate and 400 g of vinylidene fluoride, were charged, and the system was raised in temperature up to 50° C. in 2 hours and held at 50° C. During this period, a maximum pressure of 6.3 MPa was reached. After 0.5 hour, 400 g of vinylidene fluoride was gradually added so as to keep a polymerization pressure of 5.99-6.01 MPa. Polymerization was continued for ca. 13.5 hours at 50° C. thereafter to effect a totally 33.25 hours of suspension polymerization from the temperature raising until the pressure was lowered to 2.5 MPa. After the polymerization, the polymer slurry was dewatered, washed with water and dried at 80° C. for 20 hours to obtain Polymer powder B. The polymerization conversion was 93.3%, and Polymer B thus obtained exhibited an inherent viscosity of 0.988 dl/g.

Example 3

Into an autoclave having an inner volume of 20 liter, 10,894 g of deionized water, 2.095 g of methyl cellulose, 108.94 g of ethyl acetate, 4.19 g of diisopropyl peroxydicarbonate and 4,190 g of vinylidene fluoride, were charged, and the system was raised in temperature up to 60° C. in 2 hours and held at 60° C. A maximum pressure of 7.1 MPa was reached at a point of polymerization conversion of ca. 18%. Further, from a point of time after 0.5 hour (as a period lapsed from the temperature raised to 50° C.) when the polymerization conversion of the initially charged monomer reached ca. 45% to reach a pressure of 6.0 MPa, 4,190 g of vinylidene fluoride was gradually added so as to keep a polymerization pressure of 5.99-6.01 MPa. Polymerization was continued for 6.3 hours at 60° C. thereafter, to effect a totally 17.0 hours of suspension polymerization from the temperature raising until the pressure was lowered to 2.0 MPa. After the polymerization, the polymer slurry was dewatered, washed with water and dried at 80° C. for 20 hours to obtain Polymer powder C. The polymerization conversion was 96.1%, and Polymer C thus obtained exhibited an inherent viscosity of 0.999 dl/g.

Example 4

Into an autoclave having an inner volume of 20 liter, 10,894 g of deionized water, 2.095 g of methyl cellulose, 83.8 g of diethyl carbonate, 4.19 g of diisopropyl peroxydicarbonate and 4,190 g of vinylidene fluoride, were charged, and the system was raised in temperature up to 50° C. in 2 hours and held at 50° C. A maximum pressure of 6.5 MPa was reached. Further, from a point of time after 0.5 hour, 5,447 g of vinylidene fluoride was gradually added so as to keep a polymerization pressure of 5.99-6.01 MPa. Polymerization was continued for 6.3 hours at 50° C. thereafter to effect a totally 25.2 hours of suspension polymerization from the temperature raising until the pressure was lowered to 2.5 MPa. After the polymerization, the polymer slurry was dewatered, washed with water and dried at 80° C. for 20 hours to obtain Polymer powder I. The polymerization conversion was 98.5%, and Polymer I thus obtained exhibited an inherent viscosity of 1.070 dl/g.

Example 5

Into an autoclave having an inner volume of 20 liter, 10,894 g of deionized water, 2.095 g of methyl cellulose, 159.22 g of ethyl acetate, 2.095 g of diisopropyl peroxydicarbonate, 4,106.2 g of vinylidene fluoride and 83.8 g of propylene hexafluoride, were charged, and the system was raised in temperature up to 50° C. in 2 hours and held at 50° C. A maximum pressure of 6.2 MPa was reached. Further, from a point of time after 0.5 hour, 5,447 g of a monomer mixture including 5,338.06 g of vinylidene fluoride and 108.94 g of propylene hexafluoride was gradually added so as to keep a polymerization pressure of 5.99-6.01 MPa. Polymerization was continued for ca. 8.8 hours thereafter at 50° C. to effect a totally 38.7 hours of suspension polymerization from the temperature raising until the pressure was lowered to 2.5 MPa. After the polymerization, the polymer slurry was dewatered, washed with water and dried at 80° C. for 20 hours to obtain Polymer powder J. The polymerization conversion was 92.1%, and Polymer J thus obtained exhibited an inherent viscosity of 0.943 dl/g.

Comparative Example 1

Into an autoclave having an inner volume of 20 liter, 10,894 g of deionized water, 2.095 g of methyl cellulose, 75.4 g of ethyl acetate, 4.19 g of diisopropyl peroxydicarbonate, and 4,190 g of vinylidene fluoride, were charged, and the system was raised in temperature up to 60° C. in 2 hours and held at 50° C. A maximum pressure of 7.1 MPa was reached. Polymerization was continued at 60° C. without feeding additional vinylidene fluoride to effect a totally 5.75 hours of suspension polymerization from the temperature raising until the pressure was lowered to 2 MPa. After the polymerization, the polymer slurry was dewatered, washed with water and dried at 80° C. for 20 hours to obtain Polymer powder D. The polymerization conversion was 89.7%, and Polymer D thus obtained exhibited an inherent viscosity of 1.107 dl/g.

Comparative Example 2

Into an autoclave having an inner volume of 2 liter, 1,036 g of deionized water, 0.20 g of methyl cellulose, 6.0 g of ethyl acetate, 0.4 g of diisopropyl peroxydicarbonate, 400 g of vinylidene fluoride, were charged, and the system was raised in temperature up to 60° C. in 2 hours and held at 60° C. A maximum pressure of 7.0 MPa was reached. Further, from a point of time after 0.5 hour, vinylidene fluoride was gradually added so as to keep a polymerization pressure of 4.06-4.08 MPa (<Pcr=4.38 MPa) until 363 g of vinylidene fluoride was added, when the polymerization was terminated since polymerization heat evolution became slight. The pressure at the time of polymerization termination was 4.06 MPa, and a totally 14.5 hours of suspension polymerization was effected from the temperature raising. After the polymerization, the polymer slurry was dewatered, washed with water and dried at 80° C. for 20 hours to obtain Polymer powder E. The polymerization conversion was 87.8%, and Polymer E thus obtained exhibited an inherent viscosity of 1.166 dl/g.

Comparative Example 3

Into an autoclave having an inner volume of 2 liter, 1,036 g of deionized water, 0.20 g of methyl cellulose, 6.0 g of ethyl acetate, 0.4 g of diisopropyl peroxydicarbonate and 400 g of vinylidene fluoride, were charged, and the system was raised in temperature up to 70° C. in 2 hours and held at 70° C. A maximum pressure of 7.2 MPa was reached. Further, from a point of time after 0.5 hour, vinylidene fluoride was gradually added so as to keep a polymerization pressure of 4.06-4.08 MPa until 168 g of vinylidene fluoride was added, when the polymerization was terminated since polymerization heat evolution became slight. The pressure at the time of polymerization termination was 4.08 MPa, and a totally 7.8 hours of suspension polymerization was effected from the temperature raising. After the polymerization, the polymer slurry was dewatered, washed with water and dried at 80° C. for 20 hours to obtain Polymer powder F. The polymerization conversion was 87.0%, and Polymer F thus obtained exhibited an inherent viscosity of 1,069 dl/g.

Comparative Example 4

Polymerization was performed in the same manner as in Example 1 of JP-A 2002-220403.

More specifically, into an autoclave having an inner volume of 2 liter, 1,204 g of deionized water, 160 g of 1,1,2,2,3-pentafluoro-1,3-dichloropropane, 0.30 g of methyl cellulose, 10 g of ethyl acetate, 0.12 g of diisopropyl peroxydicarbonate and 240 g of vinylidene fluoride, were charged, and the system was raised in temperature up to 60° C. in 2 hours and held at 60° C. A maximum pressure of 4.5 MPa was reached. Further, from a point of time after 0.5 hour, 240 g of vinylidene fluoride was gradually added so as to keep a polymerization pressure of 4.15-4.17 MPa. Thereafter, polymerization was continued for ca. 5.4 hours at 60° C. to effect a totally 12.0 hours of suspension polymerization from the temperature raising until the pressure was lowered to 1.5 MPa. After the polymerization, the polymer slurry was dewatered, washed with water and dried at 80° C. for 20 hours to obtain Polymer powder H. the polymerization conversion was 95.0%, and Polymer H thus obtained exhibited an inherent viscosity of 0.99 dl/g.

Incidentally, in any of the above-described Examples and Comparative Examples, no attachment or clogging with polymer was found in the polymerization vessel or at connecting lines during or after the polymerization.

The outline of polymerization conditions in the above-described Examples and Comparative Examples and the ionic conductivity, total organic carbon, yellowness index YI of the resultant vinylidene fluoride polymers measured according to the formerly described methods are inclusively shown in the following Table 1 together with measured results of commercially available vinylidene fluoride polymers of improved colorability-grade (Reference Examples 1 and 2).

TABLE 1

Outline of polymerization processes in Examples and Comparative Examples and Evaluation of product polymers

|  | Example 1 [parts] | Example 2 [parts] | Example 3 [parts] | Example 4 [parts] | Example 5 [parts] | Comp. 1 [parts] |
|---|---|---|---|---|---|---|
| Monomer: Initial + Added later | 100 + 111 | 100 + 100 | 100 + 100 | 100 + 130 | 100 + 130 | 100 + 0 |
| Deionized water | 260 | 260 | 260 | 260 | 260 | 260 |
| Diisopropyl peroxydicarbonate | 0.05 | 0.05 | 0.1 | 0.1 | 0.05 | 0.1 |
| Initiator/Total monomer (wt. %) | 0.024 | 0.025 | 0.050 | 0.043 | 0.0022 | 0.100 |
| Methyl cellulose | 0.05 | 0.05 | 0.05 | 0.05 | 0.05 | 0.05 |
| 1,1,2,2,3-pentafluoro-1,3-dichloropropane | — | — | — | — | — | — |
| Chain transfer agent: ethyl acetate (diethylcarbonate) | 3 | 3.8 | 2.6 | (2.0) | 3.8 | 1.8 |
| Temperature raising time [h] | 2 | 2 | 2 | 2 | 2 | 2.4 |
| Total polymerization time [h] | 23.8 | 33.25 | 17.0 | 25.2 | 38.7 | 5.75 |
| Polymerization temperature [° C.] | 50 | 50 | 60 | 50 | 50 | 60 |
| Maximum pressure [MPa] | 6.3 | 6.3 | 7.1 | 6.5 | 6.2 | 7.1 |
| Pressure after starting the additional monomer'a supply [MPa] | 6.0 | 6.0 | 6.0 | 6.0 | 6.0 | — |
| Polymerization yield [%] | 86.5 | 93.3 | 96.1 | 98.5 | 92.1 | 89.7 |
| Inherent viscosity η inh[dl/g] | 1.15 | 0.988 | 0.999 | 1.07 | 0.943 | 1.107 |
| Eluted ionic component · Ionic conductivity σ[μS/cm] (85° C. · 1000 hr) | 6.22 | 7.78 | 8.54 | 9.28 | 8.21 | 14.9 |
| Total organic carbon [ppb] (85° C. · 1000 hr) | 664 | 1087 | 1131 | 1352 | 1258 | 3408 |
| YI value (260° C. · 3 h) | −24.9 | −5.9 | −4.0 | −2.1 | −2.5 | 20.7 |

|  | Comp. 2 [parts] | Comp. 3 [parts] | Comp. 4 [parts] | Ref. 1 Com. Product S* | Ref. 2 Com. Product K* |
|---|---|---|---|---|---|
| Monomer: Initial + Added later | 100 + 91 | 100 + 42 | 60 + 60 | | |
| Deionized water | 259 | 259 | 301 | | |
| Diisopropyl peroxydicarbonate | 0.1 | 0.1 | 0.03 | | |
| Initiator/Total monomer (wt. %) | 0.052 | 0.070 | 0.025 | | |
| Methyl cellulose | 0.05 | 0.05 | 0.075 | | |
| 1,1,2,2,3-pentafluoro-1,3-dichloropropane | — | — | 40 | | |
| Chain transfer agent: ethyl acetate (diethylcarbonate) | 1.5 | 1.5 | 2.5 | | |
| Temperature raising time [h] | 2 | 2 | 2 | | |
| Total polymerization time [h] | 14.5 | 7.8 | 12.0 | | |
| Polymerization temperature [° C.] | 60 | 70 | 60 | | |
| Maximum pressure [MPa] | 7.0 | 7.2 | 4.5 | | |
| Pressure after starting the additional monomer'a supply [MPa] | 4.1 | 4.1 | 4.16 | | |
| Polymerization yield [%] | 87.8 | 87.0 | 95.0 | | |
| Inherent viscosity η inh[dl/g] | 1.166 | 1.069 | 0.99 | | |

TABLE 1-continued

Outline of polymerization processes in Examples and Comparative Examples and Evaluation of product polymers

| | | | | | |
|---|---|---|---|---|---|
| Eluted ionic component · Ionic conductivity σ[μS/cm] (85° C. · 1000 hr) | 17.4 | 21.1 | 12.1 | 21.9 | 23.2 |
| Total organic carbon [ppb] (85° C. · 1000 hr) | 1255 | 2302 | 2000 | 4735 | 15761 |
| YI value (260° C. · 3 h) | 30.6 | 46.9 | −5.0 | 40.6 | 23.2 |

*Commercial product S: Solef6010 (Solvay Co.)
*Commercial product K: Kyner 1000HD (Arkema Co.)

INDUSTRIAL APPLICABILITY

As is clear from the results shown in Table 1 above, according to the present invention wherein a monomer comprising vinylidene fluoride as a principal component is suspension-polymerized by supplying the monomer in division to a polymerization system containing a polymerization initiator at a pressure below a critical pressure Pcr of the monomer and at a pressure above Pcr, it has become possible to obtain a vinylidene fluoride polymer having excellent high-temperature coloring resistance and with remarkably less elution of organic matter and ionic components, without using a specific halogenated hydrocarbon and without incurring troublesome labor and cost for recovery thereof.

The invention claimed is:

1. A process for producing a vinylidene fluoride polymer, comprising:
   suspension-polymerization of a monomer principally comprising vinylidene fluoride by supplying the monomer to a polymerization system first at a pressure below a critical pressure Pcr (=4.38 MPa) of vinylidene fluoride to start the polymerization, and supplying an additional amount of the monomer at a pressure of at least Pcr to continue the polymerization; wherein the suspension-polymerization is performed by using a polymerization initiator in an amount of 0.001-0.09 wt. % of a total amount of the monomer supplied to the polymerization system.

2. A production process according to claim 1, wherein a polymerization conversion of the monomer first supplied to the polymerization system is below 20% when the polymerization system pressure first reaches Pcr.

3. A production process according to claim 1, wherein the additional monomer is started to be supplied at a point of time when the first supplied monomer has reached 0.1-70%.

4. A production process according to claim 1, wherein a polymerization initiator having a 10 hour-half-life temperature $T_{10}$ of 30-90° C. is used.

5. A production process according to claim 4, wherein the additional monomer principally comprising vinylidene fluoride is supplied in the course of polymerization so as to keep the pressure P in a range of from Pcr (MPa) to Pcr+5 (MPa), and the suspension-polymerization is performed at a polymerization temperature T in a range of from $T_{10}$ to $T_{10}+25$ (° C.).

6. A production process according to claim 5, wherein the additional monomer is supplied so as to keep the pressure P substantially constant, and the suspension-polymerization is performed at the polymerization temperature T.

7. A production process according to claim 1, wherein the monomer consists of vinylidene fluoride alone.

8. A heat-stable and high-purity vinylidene fluoride polymer, showing an eluted total organic carbon of at most 1,500 ppb and an ionic conductivity of at most 10 μs/cm after immersion in pure water at 85° C. for 1,000 hrs, and also showing a yellowness index YI of at most 0 after holding at 260° C. for 3 hours.

* * * * *